(12) United States Patent
Goslin et al.

(10) Patent No.: US 6,694,496 B2
(45) Date of Patent: Feb. 17, 2004

(54) FLEXIBLE PREAMBLE PROCESSING FOR DETECTING A CODE SEQUENCE

(75) Inventors: Gregory R. Goslin, Los Gatos, CA (US); Venugopal Balasubramonian, Campbell, CA (US)

(73) Assignee: Morphics Technology, Inc., Cambell, CA (US)

( * ) Notice: Subject to any disclaimer, the term of this patent is extended or adjusted under 35 U.S.C. 154(b) by 52 days.

(21) Appl. No.: 09/922,406

(22) Filed: Aug. 3, 2001

(65) Prior Publication Data

US 2002/0016949 A1 Feb. 7, 2002

Related U.S. Application Data

(60) Provisional application No. 60/222,855, filed on Aug. 3, 2000.

(51) Int. Cl.[7] .............................................. G06F 17/50

(52) U.S. Cl. ............................................ 716/4; 716/1

(58) Field of Search ........................... 716/4; 370/302, 370/335, 320; 375/150, 246, 253, 142, 131

(56) References Cited

U.S. PATENT DOCUMENTS

| 5,257,282 A | * 10/1993 | Adkisson et al. ............... 375/1 |
| 5,341,395 A | 8/1994 | Bi .................................. 375/1 |
| 5,353,301 A | * 10/1994 | Mitzlaff .......................... 375/1 |
| 5,550,811 A | 8/1996 | Kaku et al. .................... 370/18 |
| 5,894,517 A | * 4/1999 | Hutchison et al. ............. 380/9 |
| 6,389,000 B1 | * 5/2002 | Jou ............................. 370/342 |
| 2001/0048714 A1 | * 12/2001 | Jha ............................. 375/150 |

\* cited by examiner

*Primary Examiner*—Vuthe Siek
(74) *Attorney, Agent, or Firm*—Darby & Darby

(57) ABSTRACT

An architecture and method for flexible preamble processing is disclosed herein. The preamble processing engine detects a code sequence in input, where the code sequence is a sum of a first code sequence and a second code sequence The preamble processing engine includes a data input line, a code input line, a despreader, and a plurality of memory registers. The code input selectively receives the first code sequence or the second code sequence, the first code sequence having a period longer than a period for the second code sequence. The despreader is coupled to the data input line and the code input line. The despreader producing a despread result between the first code sequence and the input data. Lastly, the plurality of memory registers, which are coupled to the despreader, each stores only a portion of the despread results.

18 Claims, 7 Drawing Sheets

FLEXIBLE PREAMBLE PROCESSING FOR DETECTING A CODE SEQUENCE

CROSS-REFERENCE TO RELATED APPLICATIONS

This application claims priority to the provisional patent application with the following Ser. No. 60/222,855, filed on Aug. 3, 2000.

Related applications, which are incorporated herein by reference, are:
IMPROVED APPARATUS AND METHOD FOR MULTI-THREADED SIGNAL PROCESSING
Ser. No. 09/492,634, filed on Jan. 27, 2000.

TECHNICAL FIELD

The present claimed invention relates to the field of telecommunication. In particular, the present claimed invention relates to an apparatus and a method for descrambling data.

BACKGROUND ART

Electronic communication devices, such as cell phones, base stations, global positioning systems (GPS) are ubiquitous in everyday business and personal use. IN order to transmit information between two communication devices, they have to know that they exist. Several different methods identify how a first communication device can determine if a second communication device is trying to transmit to them. One such method is to detect a known code sequence transmitted by the second communication device on a specific channel at an unknown offset. By scanning for the known code sequence at different offsets, the first communication device can eventually obtain a match between its internally generated codes and the input data from the second communication device on the specific channel.

The process of searching input data for known codes is very computationally intensive. Because the known code sequence is a long sequence, the amount of computation that must be performed to span the known code sequence can be extensive. However the computations are somewhat repetitive and may be inefficient. Additionally, part of the known code sequence involves several possible hypotheses. This means that multiple hypotheses will have to be checked to determine if a good correlation exists, and thus more computations are required.

Furthermore, because the known channel will be searched continuously to monitor for new transmissions from other communication devices, the computation for the known code sequence can occur ad infinitum. Due to the constant and complicated computations involved, a need also exists to overcome inefficiencies with searching data for a known sequence.

In particular, power is critical in many data processing applications. And computational operations require power to be performed. Thus a need arises to overcome the limitation of excessive quantity of data computations used to search for a known sequence on a channel in order to conserve power.

The search for a new transmission is necessary to establish a link between the two communication devices. Only after a link is established can user data be transmitted between the two communication devices. The computations for the known code sequence are extensive and complicated, and thus consume a substantial amount of time. Yet performance metrics dictate that the search be conducted in a short amount of time. Consequently, a need arises for a method and apparatus to overcome the time limitations for searching a channel for the known sequence.

SUMMARY OF THE INVENTION

The present invention provides a method and apparatus that overcomes inefficiencies with the complicated and continuous computations to check a channel for a known sequence. Furthermore, the present invention overcomes the limitation of excessive quantity of data computations used to search for a known sequence on a channel in order to conserve power. Lastly, the present invention overcomes the time limitations for performing the search.

A first embodiment of the present invention provides an architecture and method for flexible preamble processing. In particular, the preamble-processing engine detects a code sequence in input, where the code sequence is a sum of a first code sequence and a second code sequence. The preamble-processing engine includes a data input line, a code input line, a despreader, and a plurality of memory registers. The code input selectively receives the first code sequence or the second code sequence, the first code sequence having a period longer than a period for the second code sequence. The despreader is coupled to the data input line and the code input line. The despreader producing a despread result between the first code sequence and the input data. Lastly, the plurality of memory registers, which are coupled to the despreader, each stores only a portion of the despread results.

These and other objects and advantages of the present invention will become apparent to those of ordinary skill in the art after having read the following detailed description of the preferred embodiments, which are also illustrated in the various drawing figures.

BRIEF DESCRIPTION OF THE DRAWINGS

The drawings included herewith are incorporated in and form a part of this specification. The drawings illustrate embodiments of the invention and, together with the description, serve to explain the principles of the invention. It should be understood that the drawings referred to in this description are not drawn to scale unless specifically noted as such.

DETAILED DESCRIPTION OF THE INVENTION

Figure 1:
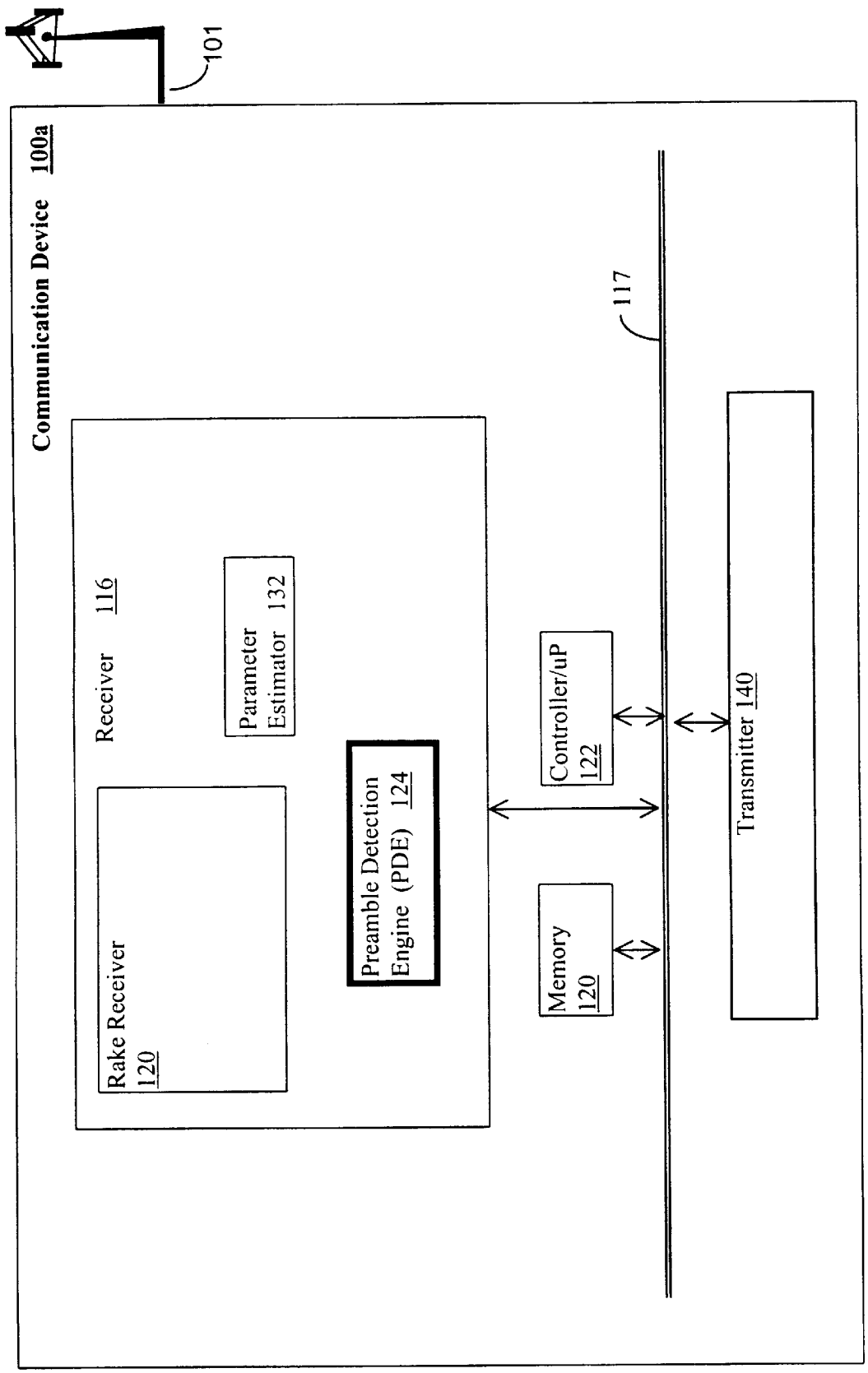
FIG. 1 is a block diagram of an electronic device with a flexible preamble detection system, in accordance with one embodiment of the present invention.

Reference will now be made in detail to the preferred embodiments of the invention. Examples of the preferred embodiment are illustrated in the accompanying drawings. While the invention will be described in conjunction with the preferred embodiments, it is understood that they are not intended to limit the invention to these embodiments. Rather, the invention is intended to cover alternatives, modifications and equivalents, which may be included within the spirit and scope of the invention, as defined by the appended claims. Additionally, in the following detailed description of the present invention, numerous specific details are set forth in order to provide a thorough understanding of the present invention. However, it will be apparent to one of ordinary skill in the art that the present invention may be practiced without these specific details. In other instances, well-known methods, procedures, components, and circuits have not been described in detail so as not to unnecessarily obscure aspects of the present invention.

The present invention can be implemented in a wide variety of communication systems, including digital direct sequence spread-spectrum (DSSS) wireless communication systems or techniques that utilize code sequences as well as TDMA and OFDM systems in both wired and wireless applications. The systems or techniques which utilize transmitter resources include, but are not limited to, fixed wireless, unlicensed Federal Communications Commission (FCC) wireless systems, wireless local area network (W-LAN), cordless telephony, cellular telephony, personal base station, telemetry, modems, and other digital data processing applications. The present invention can be applied to both transmitters, e.g., a base station, and to receivers, e.g., a terminal, for fixed wireless, W-LAN, cellular telephony, and personal base station applications, or any device that transmits information. For example, the present invention is suitable for GPS systems, encryption, and other types of communication using coded data.

In particular, the present invention is applicable to the following exemplary list of digital applications. One fixed wireless application to which the present invention may be applied is a metropolitan multipoint distribution system (MMDS). Examples include wireless cable broadcast, or two-way wireless local loop (WLL) systems. Some examples of a W-LAN, that can communicates digitized audio and data packets, for which the present invention can be applied, include Open Air and the Institute of Electrical and Electronics Engineers (IEEE) specification 802.11b. In yet another application, specific examples of an unlicensed FCC application to which the present invention may be applied include the Industrial, Scientific, and Medical band (ISM) devices, which can include cordless telephony products. Personal base stations can utilize either cordless or cellular telephony wireless communication standards. Lastly, the cellular telephony systems in which the present invention can be applied includes, but is not limited to, IS-95, IS2000, ARIB, 3GPP-FDD, 3GPP-TDD, 3GPP2, 1EXTREME, or other user-defined protocols.

Communication Device

Referring now to FIG. 1A, a block diagram of an electronic device with a flexible preamble detection system is shown in accordance with one embodiment of the present invention. Electronic communication device 100a provides an exemplary application of the present invention in a wireless direct sequence spread spectrum (DSSS) base transceiver station (BTS) in the present embodiment.

Communication device 100a includes a receiver block 116 that includes front-end processing components (not shown) and rake receiver 119 whose conventional operation is known to those skilled in the art. One of the baseband components that are illustrated in FIG. 1 is the preamble detection engine (PDE) 124. Communication device also includes parameter estimator 132, a microprocessor (uP), or controller, 122, a memory block 120, and a transmitter 140. Parameter estimator 132 provides channel estimates on frequency, phase, gain, etc. that are useful by the receiver processor to recover data, as is know by those skilled in the art. Microprocessor 122 and a memory block 120, also referred to as a host processor and host memory, respectively, are coupled to transmitter a receiver 116 via bus 117. Host processor 122 and host memory 130 support the management and exchange of data and/or instructions to the various components of communication device 100a. And transmitter 140 prepares data signals for subsequent transmission on antenna 101.

Hardware resources of communication device 100a, e.g., components in receiver 116, are applied to a single computation process, e.g., a given channel, in one embodiment. However, in another embodiment, these hardware resources can be enhanced by running them at a clock rate higher than that required by a process, e.g., higher than the data rate for a communication protocol implemented on communication device 100a. In this manner, resources of individual computation components, a receiver processor, can be time-shared across multiple computation processes, e.g., several multipaths and/or multiple channels. Additional information on the design and implementation of configurations into a configurable communication device is provided in co-pending U.S. patent application Ser. No. 09/492,634 entitled "IMPROVED APPARATUS AND METHOD FOR MULTITHREADED SIGNAL PROCESSING" by Subramanian et al., attorney docket number MORP-P002. This related application is commonly assigned, and is hereby incorporated by reference.

Communication system 100a provides an exemplary embodiment of the present invention, which is well suited to alternative embodiments. For example, in other embodiments, communication system 100a is mobile handset user equipment (UE) an embedded modem, or an electronic device in another code-dependent application. A three-sector non-diversity antenna array 101 is shown for illustrative purposes only in the present embodiment.

Flexible Preamble Detection System and Engines

Figure 2:
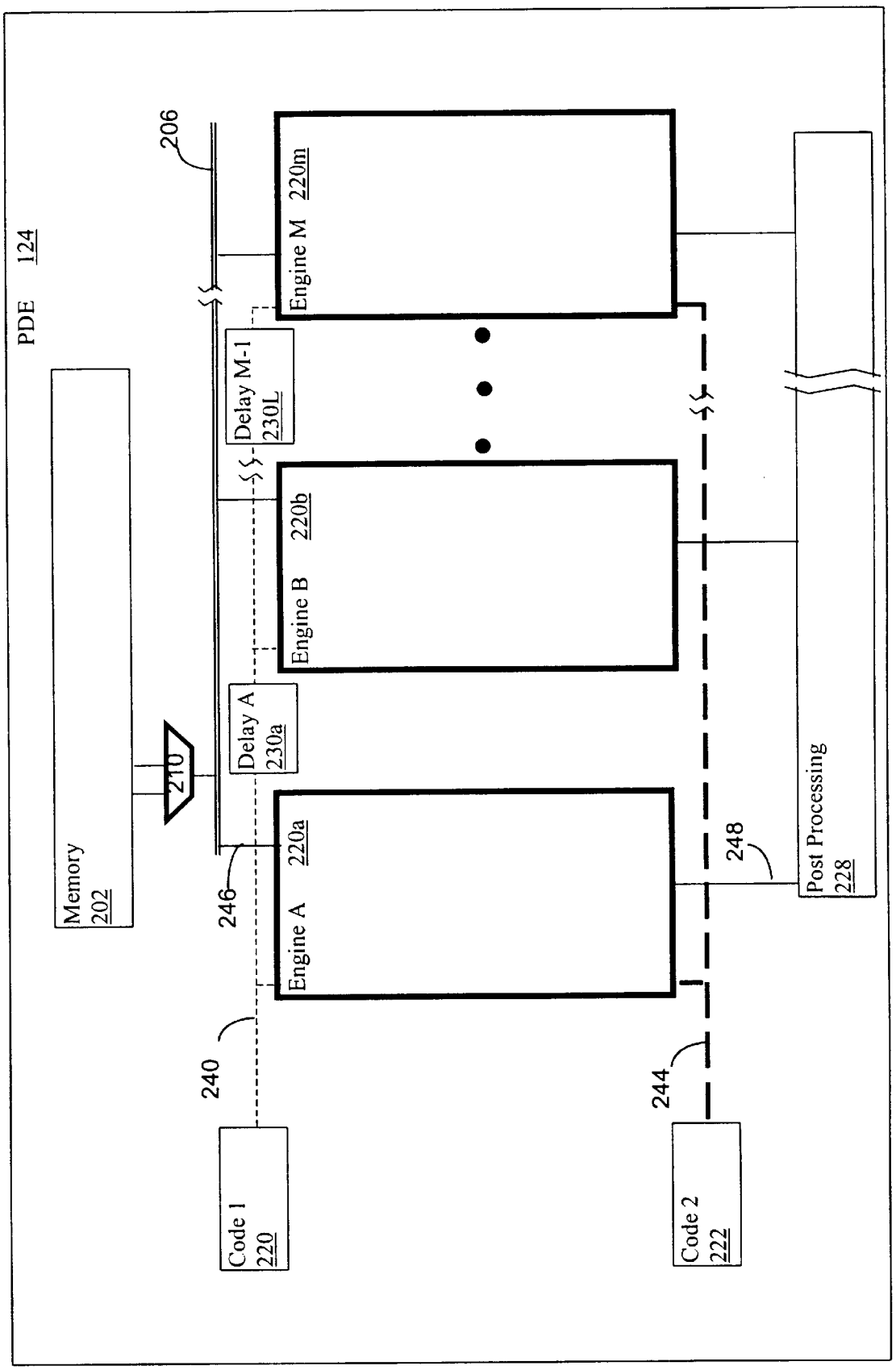
FIG. 2 is a block diagram of a flexible preamble detection system, in accordance with one embodiment of the present invention.

Referring now to FIG. 2, a block diagram of a flexible preamble detection system, in accordance with one embodiment of the present invention. FIG. 2 provides an exemplary embodiment of PDE 124 of FIG. 1.

PDE 124 includes memory 202 for receiving input data, e.g., from antenna 101 of FIG. 1, a MUX 210 to select the I phase of input data for parallel processing on the bank of engines, engines A 220a through engine M 220m, through bus 206. A separate bank of engines (not shown) is provided for to process the Q phase of input data. The resultant outputs from the two banks of engines are reconciled in post processing block 228.

PDE includes a code 1 engine 220 and a code 2 engine 222, either of which can be a code generator or a sequence of data stored in memory. Code block 1 220 is a long code sequence in the present embodiment, while code block 2 222 is a short code sequence, e.g., a Walsh code generator. Code block 1 220 is coupled in parallel to engines, e.g., engine A 220a through engine M 220m via line 240, with delay blocks delay A 230a through delay M-1 230L located between adjacent engines, in PDE 124. Note that engine A 220 does not have a delay block coupled between engine A 220 and code block 1 220. This assumes that the first block has zero delay. However, in another embodiment, a delay block could be coupled between engine A 220*a* and code block 1 220. Delay blocks, 230*a* through 230L are a tap delay line in the present embodiment. Code block 2 is also coupled in parallel to each of the multiple engines, e.g. engine A 220*a* through engine M 220*m* via line 244. Any number of engines can be implmented in FIG. 2, depending upon the application.

Post processing block 228 provides functions and components known by those skilled in the art. In an alternative embodiment, post-processing block 228 provides efficient and reduced power frequency offsetting and sorting functions.

Figure 3A:
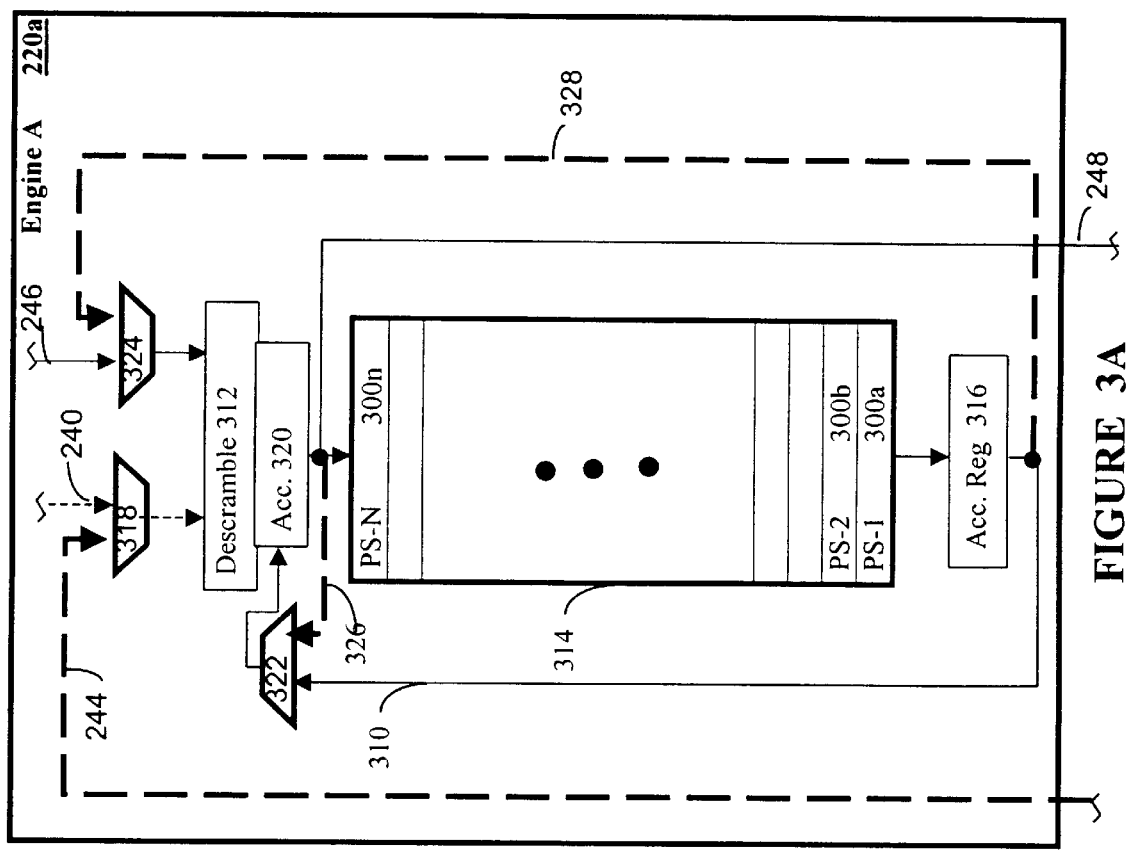
FIG. 3A is a block diagram of a flexible preamble detection engine, in accordance with one embodiment of the present invention.

Referring now to FIG. 3A, a block diagram of a flexible preamble detection engine, in accordance with one embodiment of the present invention. FIG. 3A provides an exemplary embodiment of flexible engine 220*a* of FIG. 2.

Flexible engine includes a memory block 314 having multiple individual memories, or registers, labeled PS-1 300*a* through PS-N 300*n* for a total quantity of N separate memories. Engine 220*a* also includes MUX 318, MUX 322, and MUX 324, descramble unit 312, accumulate register 320, and accumulate register 316. MUX 318 is linked to line 244 from code block 2 222 and to line 240 from code block 1 220. MUX 318 communicates information from either of these lines to descramble unit 312. Similarly, MUX 324 is coupled to input line 246 and to feedback line 328. Feedback line 328 is coupled to accumulate register 316. MUX 322 is coupled to feedback line 310 and to line 326. Output from MUX 322 is provided to accumulate register 320. Lines 326 and 248 are coupled to accumulate register 320, the latter to provide final output from engine A 220*a*. Memory block 314 is implemented as a circular buffer, whose contents scroll down, in the present embodiment.

Descramble unit 312 is capable of performing complex descrambling operations. These operations include multiplication and/or summing in the present embodiment. However, the present invention is well suited to using an alternative method and apparatus for descrambling. Accumulate registers 320 and 316 perform accumulation operations and store the results in memory.

Figure 3B:
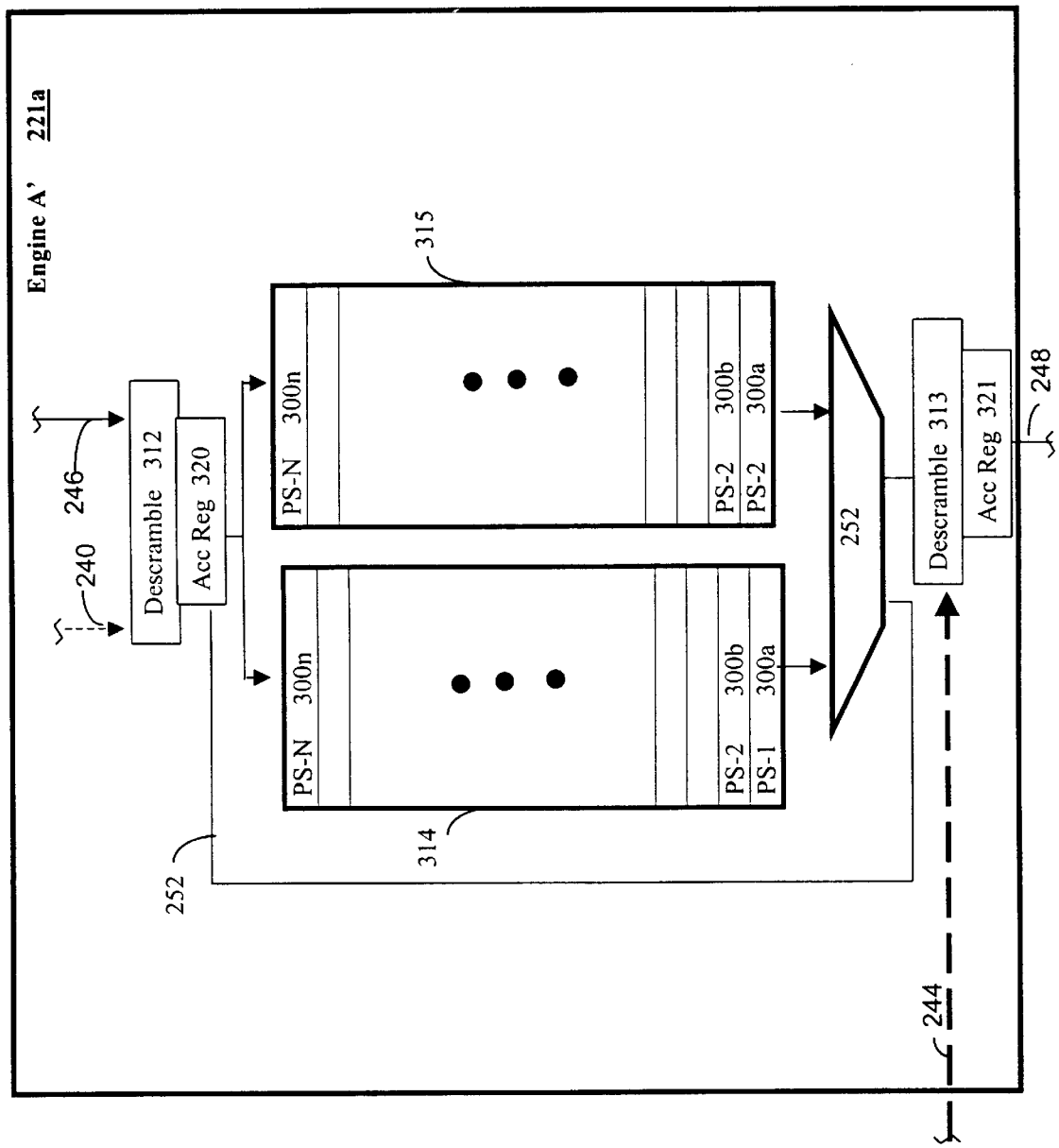
FIG. 3B is a block diagram of an alternative flexible preamble detection engine, in accordance with one embodiment of the present invention.

Referring now to FIG. 3B, a block diagram of an alternative flexible preamble detection engine, in accordance with one embodiment of the present invention. Engine A' 221*a* most notably includes two memory blocks 314 and 315, that provide a ping pong, e.g., dual, buffer architecture that allows simultaneous processing.

Engine A' 221*a* also includes a selective interconnect 252, shown as a MUX, coupled to the output of memory blocks 314 and 315. Selective interconnect 252 can couple output line from either memory block 314 or 315 to either feedback line 252 or to descramble unit 313. Output line 252 of MUX 252 is coupled back to accumulate register 320. The other output from MUX 252 is coupled to descramble unit 313. Accumulate register 321 is coupled to receive output from descrambler 313, and has a feedback to descrambler, as well as an output line 248. Similarly, accumulate register 320 is coupled to receive output from descramble block 312, and is coupled to both memory blocks 314 and 315. Input line 244 from Code block 2 222 is coupled to descrambler 313.

Figure 4:
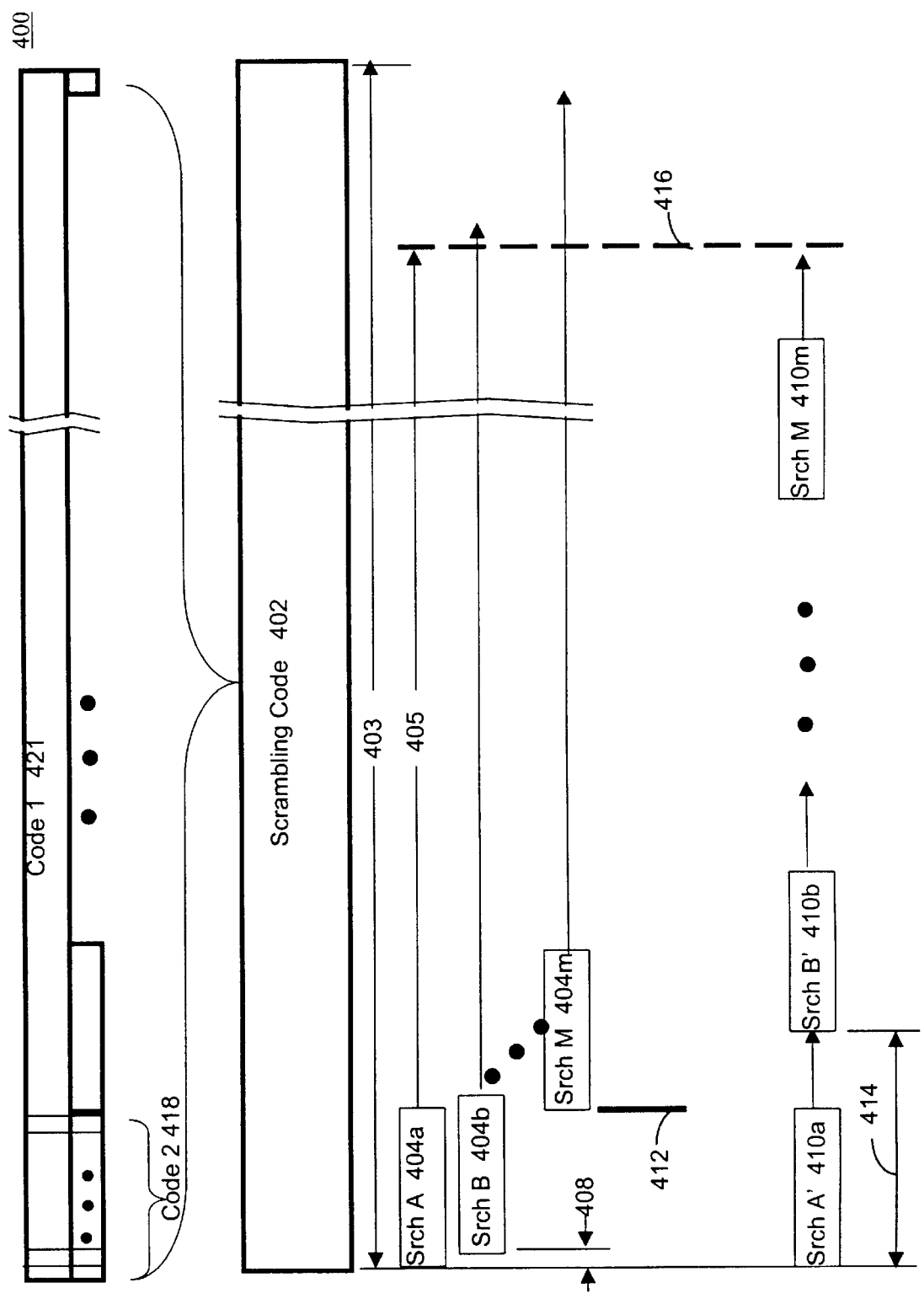
FIG. 4 is a graph of code sequence being sought and the search windows used to find it, in accordance with one embodiment of the present invention.

Referring now to FIG. 4, a graph of code sequence being sought and the search windows used to find it, in accordance with one embodiment of the present invention. FIG. 4 is provided as an illustration of the code sought, and of the search methods used to descramble the code.

The code that is provided when one communication device wants to establishing a link with another communication device, has contributions from two codes. The first code is code 1 421 that has a long period, e.g., at least length 403, while the second code is code 2 418, e.g., a Walsh code, with a much shorter period 418. Code 2 418 is repeated at its period throughout the length of code 1 421. Code 1 421 and code 2 418 both contribute to the resulting code 402. Code 402 is the code that PDE 124 is attempting to detect from input data received on antenna 101. Descrambling, or search, process A 404*a* through search process M 404*m* conducts a parallel independent descrambling operation with different code offsets from each other, e.g., offset 408 between search process A 404*a* and search process B 404*b*. After search processes A 404*a* through M 404*m* complete their descrambling operations across the search window, e.g., window length 405, each process A 404*a* can continue their respective offset by starting at a distance of 408 away from point 412, the last search process completed.

An alternative search process is shown as search A' 410*a* through search M 401*m*. This search process essentially performs a parallel search whose results are added to obtain the overall descrambling results for the entire search window, e.g., to window length 405. The difference between search process A 404*a* and search process A' depends on the relative offsets between the search processes, e.g., offset 408 versus offset 414, respectively, and the processing control of when the descrambling operation ceases and how the results are combined. More information on these processes is provided in flowcharts embodiments hereinafter.

Processes

Figure 5A:
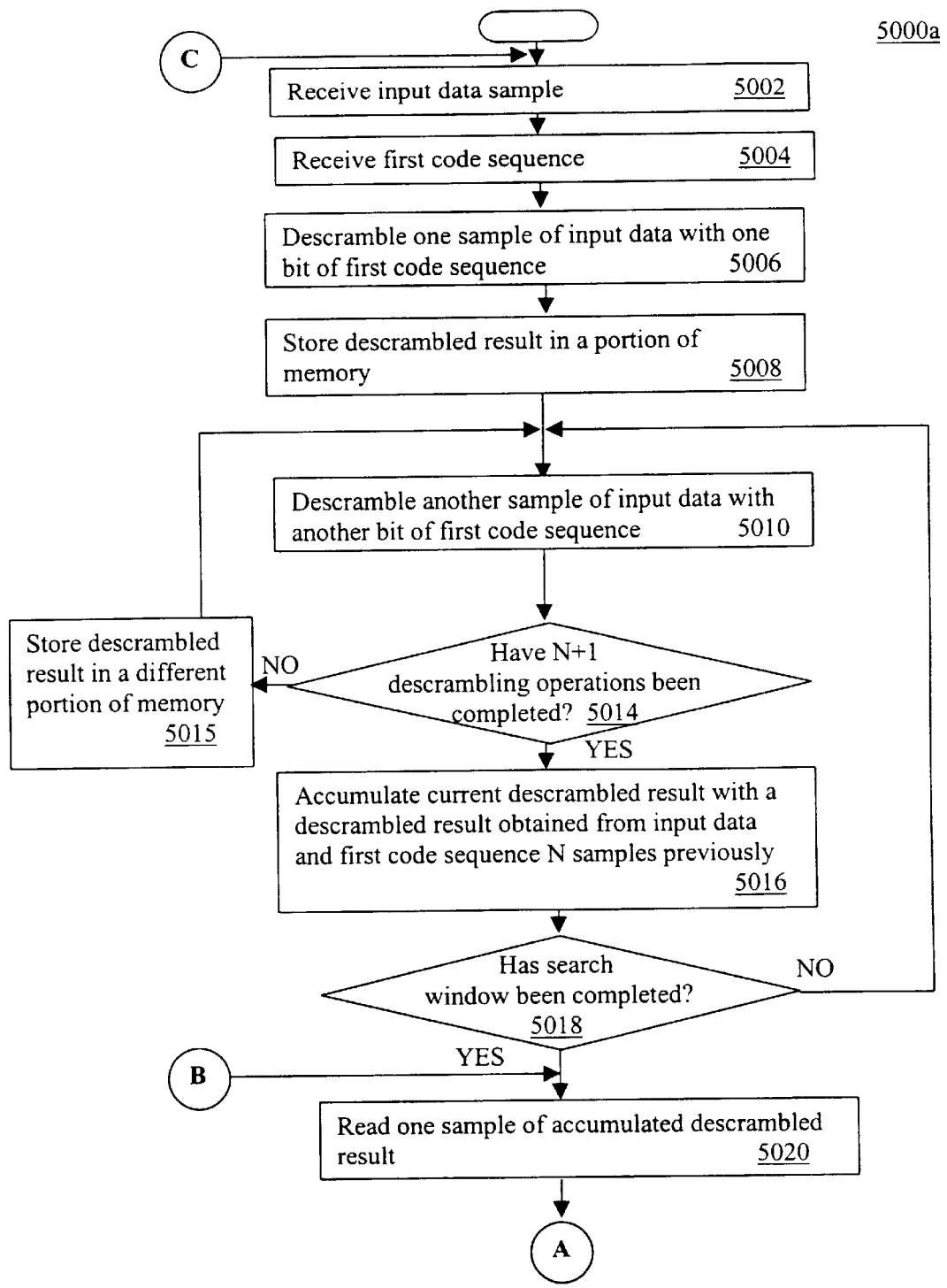
FIG. 5A is a flowchart of a process for detecting a code sequence in input signal, in accordance with one embodiment of the present invention.

Referring now to FIG. 5A is a flowchart of a process for detecting a code sequence in input signal, in accordance with one embodiment of the present invention. FIG. 5A is a flowchart of a process for operating a flexible preamble detection engine, in accordance with one embodiment of the present invention.

Flowchart 5000*a* begins with step 5002. In step 5002 of the present embodiment, an input data sample is received. Step 5002 is implemented in one embodiment by receiving a sample, e.g., a multiple bit sample of a received symbol, at PDE from antenna 101, written to memory 202, and then communicated via MUX 210 to bus 206, from which it is separately transmitted to the plurality of engines. For example, line 246 communicates the result from bus 206 to descramble block 312 of engine A 220*a* via MUX 318. The appropriate logic that enables MUX 318 to pass the input to engine A 220*a* is provided by logic in PDE 122 (not shown) or by host controller 122 and host memory 120. Engine A' 221*a* does not have a MUX device on input line 246 because descramble block 312 is dedicated to the input data. This input sample represents the channel on which a known code sequence is transmitted for purposed of establishing a communication link between an external device and the communication device 100*a*. Following Step 5002, flowchart 5000*a* proceeds to step 5004.

In step 5004 of the present embodiment, the first code sequence is received. Step 5004 is implemented in one embodiment by receiving the first code sequence from Code 1 block 220 of FIG. 2 on line 240. Note that the code is delayed between successive engines, e.g., Engine A 220*a* and engine B 220*b* and engine M 220*m*. Thus, steps in flowcharts 5000*a* and 5000*b* exist on a per-engine basis. The type of search dictates the amount of the delay. For example, Search A 404*a* through search M 404*m* have an offset of 408 between successive engines running the successive searches. In the present embodiment, this offset is a value of 1 chip and the search is called a parallel search at unique offsets. Thus in this embodiment, search A 404*a* through search M 404*m* must each traverse the length of the search window 405 in order to obtain results for their individual searches. In contrast, search method A' 410*a* through M' 410*m* perform a search through the search window length 405 in parallel, dividing up the search window and taking a portion thereof. Consequently, this search methodology takes the search window 405 and divides it by the number of engines, e.g., Engine M 220*m*. At the conclusion of the search, the results from all the engines are added to obtain the resultant descrambling operation for the given code offset between the first code and the input data. Following Step 5004, flowchart 5000*a* proceeds to step 5006.

In step 5006 of the present embodiment, one sample of the input data is descrambled with one bit of the first code sequence. Step 5006 is implemented in one embodiment by descramble block 312 of Engine A 220*a* in FIG. 3A or 3B. Descrambling is the operation of performing a multiply operation between two values. Due to the autocorrelation properties, if two code sequences are aligned with zero offset, then the multiplication operation has the effect of recovering a version of the original signal. Thus, different mathematical operations can be utilized in alternative embodiments to accommodate the despreading function. For example, through manipulation of signals, an add operation can be utilized in one embodiment to accommodate the descrambling operation. The present embodiment starts with a zero offset between code 1 and a predetermined boundary of input data, although another embodiment has a non-zero offset. Following Step 5006, flowchart 5000*a* proceeds to step 5008.

In step 5008 of the present embodiment, the descrambled result is stored in a portion of memory. Step 5008 is implemented in one embodiment by storing the first result in memory block 314. As this is the first descrambled result for a given offset, it is automatically written into a buffer in memory. For example, this first descrambled result can be stored in memory buffer PS-1 300*a*. Following Step 5008, flowchart 5000*a* proceeds to step 5010.

In step 5010 of the present embodiment, another sample of input data is descrambled with another bit of the first code sequence. In other words, both the input data and the first code sequence advance by one sample and thus maintain the offset, with respect to each other, from which they started. Step 5010 is implemented in one embodiment by incrementing the input data received from memory 202 using known memory reading techniques and by incrementing the code from code block 220 using known incrementing techniques. Following Step 5010, flowchart 5000*a* proceeds to step 5014.

In step 5014 of the present embodiment, an inquiry determines whether N+1 descrambling operations have been completed. If N+1 descrambling operations have been completed, then flowchart 5000*a* proceeds to step 5016. Otherwise, if N+1 descrambling operations have not been completed, then flowchart 5000*a* proceeds to step 5015. In the present embodiment, N is the length of the second code sequence, thus its period restarts on the Nth+1 value. This is because the descrambling and accumulating operations of the present flowchart are being performed using this same periodicity. Step 5002 is implemented in by generating a memory buffer whose quantity of registers is equal to the value of N, as is the case with memory buffer 314, which has N registers. Additionally, buffer 314 is a circular buffer by virtue of its read and write operations occurring on opposite ends of the buffer. Thus, no logic is effectively required beyond that of the existing read/write logic instructions necessary to operate components in FIG. 3A. Another embodiment utilizes a large memory with write instructions that cycle with the period N.

Step 5015 arises if N+1 descrambling operations have not been completed per step 5014. In step 5015 of the present embodiment, the descrambled result is stored in another portion of memory, e.g., another memory register. Step 5015 is implemented in one embodiment by operating circular buffer 314 to obtain a new write position. Thus, if the first descrambling result for a given descrambling process was stored in memory register PS-1 300*a*, then the second descrambling result for the given descrambling process will be stored in PS-2 300*b*. Following Step 5015, flowchart 5000*a* returns to step 5010.

Step 5016 arises if N+1 descrambling operations have been completed per step 5014. In step 5016 of the present embodiment, the current descrambled result is accumulated with a descrambled result obtained from input data and first code sequence N samples previously. Step 5016 is implemented in one embodiment by Engines A 220*a* and A' 221*a* as shown in FIGS. 3A and 3B. In short, the descrambled results that are N steps, 2N steps, etc. away from the starting port of the descrambling operation will be accumulated. Thus, for example, descrambled results between the $1^{st}$ data sample and the $1^{st}$ bit of first code will be accumulated with the descrambled results from the $17^{th}$ data sample and the $17^{th}$ bit of the first code, as will be the descrambled results from the $33^{rd}$ data sample and the $33^{rd}$ bit of the first code. The periodicity of these samples is equal to 16, which is the period of the second code sequence, e.g., the Walsh code, for the present embodiment. Because the memory registers of the processing engine A 220*a* and engine A' 221*a* also equal N, e.g., 16, then the accumulated data will coincide with the period of the memory registers. The present embodiment was set up with this relationship to simplify memory writing in the circular buffer 314. However, another embodiment utilizes more memory registers, or partitions of memory, than the period for the second code sequence, assuming that control logic tracks the read/write operations for consistency. The feedback loops from accumulate register 316 are provided via MUX 322 to be accumulated by block 320 with the results of the present descrambling operation produced by 312 and communicated to block 320. Following Step 5016, flowchart 5000*a* proceeds to step 5018.

In step 5018 of the present embodiment, an inquiry determines whether the search window has been completed. If the search window has been completed, then flowchart 5000*a* proceeds to step 5020. However, if the search window has not been completed, then flowchart 5000*a* returns to step 5010. Step 5018 is implemented in one embodiment by control logic that can count the number of elapsed cycles or determines the position of a code sequence and implements a flag for completion of the search window. The end of the search window will occur, for example, when the entire block of search operation A 404*a* of FIG. 4A, e.g., operated on Engine A 220*a*, passes line 416 which indicates the search window length 405. Alternatively, the end of the search window will occur when the entire block of search operation A' 410*a* traverses the quantity of samples represented by length 414. When search operation A' 410*a* traverses length 414, search process M 410*m* will have likewise passed line 416 indication the completion of the overall descrambling process for the given offset between the first code sequence and the input data. This comparison of search windows on a per engine basis illustrates the tradeoffs such as time to completion between search process A 404*a* and search process A' 410*a*. The choice of the search window 405 involves a tradeoff between reliability in results versus time to completion. The longer the search window, the more accurate the despreading results, as noise and other errors are offset by valid data.

Step 5020 arises if the search window has been completed per step 5018. At this point, the buffers in memory block 314 have accumulated a search window worth of data, either independently for search processes A 404*a* through M 404*m*, or cumulatively, for search process A' 410 through M 410*m*. In step 5020 of the present embodiment, one sample of the accumulated descrambled result is read. Step 5020 is implemented in one embodiment by reading one register from memory block 314. For example, if the search window is a multiple of the period of the second code sequence, e.g., length N, then PS-1 300*a* should be in the position shown in FIG. 3A. The one sample of accumulated descrambled data is fed through accumulate register 316 via line 328 to MUX 324 to be subsequently fed into descramble block 312. Following Step 5020 flowchart 5000*a* proceeds to step 5022, as indicated by connector symbol 'A'. Flowchart 5000*a* continues from FIG. 5A to subsequent FIG. 5B.

Figure 5B:
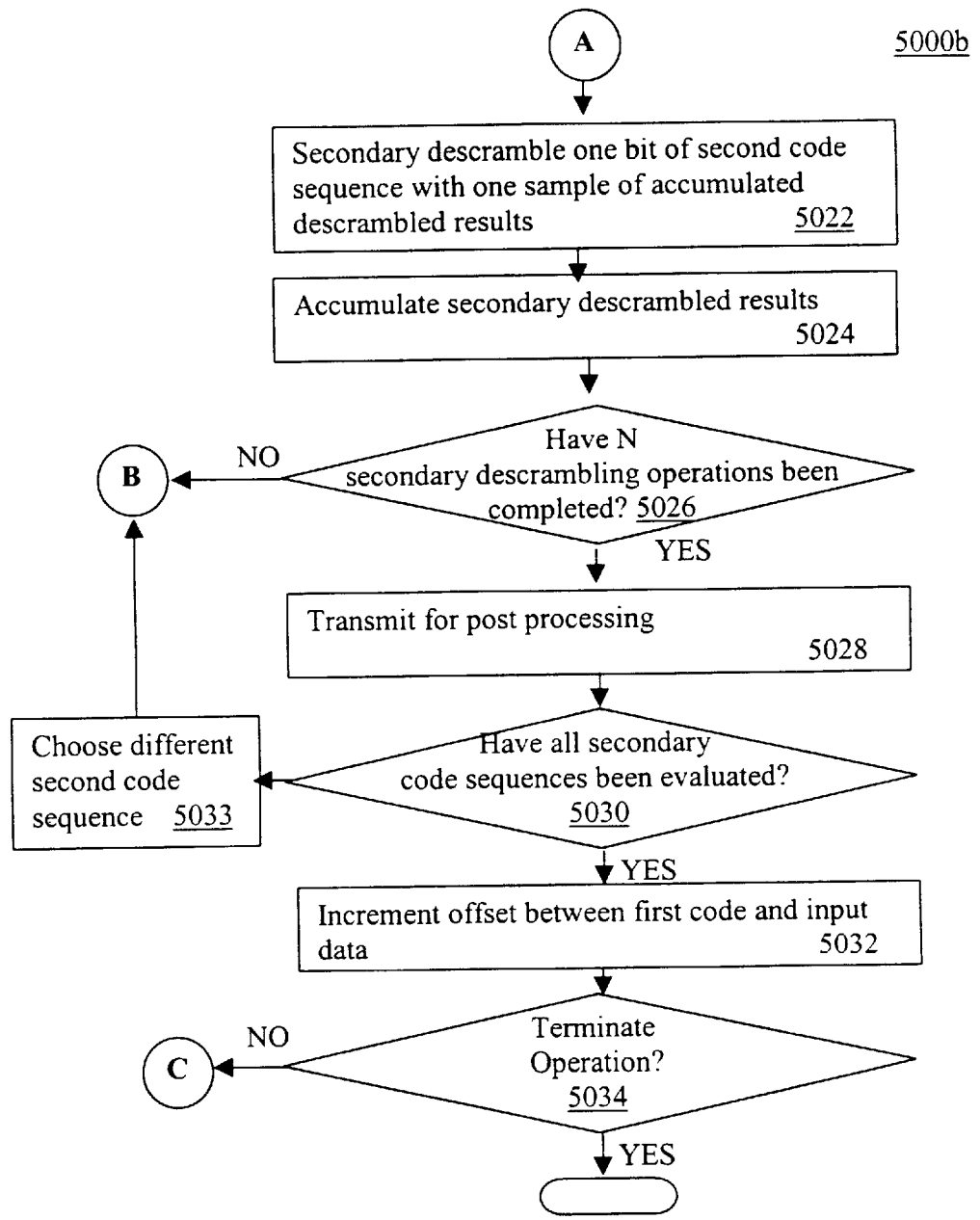
FIG. 5B is a continuation of the process for detecting a code sequence in input signal, in accordance with one embodiment of the present invention.

Referring now to FIG. 5B is a continuation of the process for detecting a code sequence in an input signal, in accordance with one embodiment of the present invention. Flowchart 5000*b* of FIG. 5B is a continuation from flowchart 5000*a* of FIG. 5A to subsequent FIG. 5B.

In step 5022 of the present embodiment, one bit of the second code sequence undergoes a secondary descrambling operation with one sample of the accumulated descrambled results. Step 5022 is implemented in one embodiment by Engine A 220*a*. Descramble block 312 is the same block used in step 5006 and 5010. However, MUX 324 now selects feedback line 328 which communications the accumulated descrambled results from the bottom of the memory register 314 to descramble block 312. Similarly, MUX 318 now selects second code input line 244 to be fed into descramble block 312. Logic for MUX 318 and 324 is described in step 5002. Alternatively, step 5022 is implemented in engine A' 221*a* of FIG. 3B by reading a register from the appropriate memory block, e.g., 314 into MUX 252, which selects output to descrambler 313. Second code line has dedicated access to descrambler 313. Following Step 5022, flowchart 5000*b* proceeds to step 5024.

In step 5024 of the present embodiment, secondary descrambled results are accumulated. Step 5024 is implemented in one embodiment by accumulator block 320 (VENU IS This RIGHT?) for engine A 220*a* and by accumulator block 321 for engine A' 221*a*. Following Step 5024, flowchart 5000*b* proceeds to step 5026.

In step 5026 of the present embodiment an inquiry determines whether N quantity of secondary descrambling operations have been completed. If N quantity of secondary descrambling operations has been completed, then flowchart 5000*b* proceeds to step 5028. However, if N quantity of secondary descrambling operations has not been completed, then flowchart 5000*b* returns to step 5020, via pointer 'B'. Step 5026 is implemented in one embodiment by repeating control logic tracking or counting iterations and providing the appropriate control logic to MUXs in engine A 220 and engine A' 221*a*. A total of N iterations is utilized for step 5026 because of the periodicity of the second code sequence and its relationship to how the descrambled results were sorted and storied in step 5002 through 5016, which is now being directly used in the descrambling operation.

Step 5028 arises if N secondary descrambling operations have been completed per step 5026. In step 5028 of the present embodiment, the accumulated secondary descrambled results are transmitted. Step 5028 realizes the goal of the overall PDE, and that is to descramble the input data sample by sample and accumulate the results over the period of the search window. The present flowcharts 5000*a* and 5000*b* accomplish this goal in a segregated manner to achieve efficiencies in mathematical operations. For example, by saving the secondary descrambling operation until the first descrambling operation is complete, a significant quantity of descrambling operations are eliminated by a simple accumulating of intermediate results. Consequently, the present invention provides a significant reduction in operation complexity, e.g., MOPS, which translate directly into lower energy draw from communication device 100*a*. Furthermore, by providing any quantity of parallel engines in PDE 124, the present invention increases the speed in which all hypotheses are tested. Step 5028 is implemented in one embodiment by providing control logic to post processing block 228 to accept output results on output line 248. Following Step 5028, flowchart 5000*b* proceeds to step 5030.

In step 5030 of the present embodiment, an inquiry determines whether all relevant secondary code sequences have been evaluated. If all relevant secondary code sequences have been evaluated, then flowchart 5000*b* proceeds to step 5033. However, if all the relevant code sequences have not been evaluated, then flowchart 5000*b* proceeds to step 5032. Step 5030 accommodates for the fact that the entire code sequence is not initially known. Rather, only the long code, e.g., code 1 421 of FIG. 4 is known for certain. That is, multiple possible code sequences exist for the shorter code sequence, e.g., code 2 418. In one embodiment, sixteen possible hypothesis of a sixteen bit long Walsh code are utilized for the set of hypothesis that must be evaluated to determine if the received signal has any of them. The present invention can accommodate any quantity of hypotheses for any length of second code by utilizing flowcharts 5000*a* and 5000*b* and by having appropriately sized hardware, e.g., memory buffer equal to sequence length N. Step 5026 is implemented in one embodiment by control logic, e.g., local control or host controller 122, that controls generation of second code sequence from code 2 block 222. In another embodiment, control logic can reduce the set of possible code sequences for code 2 based on history or instructions.

Step 5032 arises if all secondary code sequences have been evaluated per step 5030. In step 5032 of the present embodiment, the offset between the first code and the input data is incremented. To continue searching through all the possible combinations in code space, the offset between the input data and the first code sequence is now incremented. In this manner, steps of 5002 through 5030 are repeated anew for the incremented offset. The choice of offset is 1 chip in the present embodiment, although other offsets can be used in another embodiment. Step 5032 is implemented in one embodiment by providing control logic to code block 1 220 that will advance the code generator in code space. Memory registers are also cleared to prepare for the next operation. The process of flowchart 5000*a* and 5000*b* is repeated for a second bank of PDE 124 in the present embodiment to accommodate the Q phase of the input data. However, an alternative embodiment can utilize a different configuration to accommodate both phases of the input data. Following Step 5032, flowchart 5000*b* proceeds to step 5034.

In step 5034 of the present embodiment, an inquiry determines whether operation is terminated. If operation is terminated, then flowchart 5000b ends. However, if operation is not terminated, then flowchart 5000b returns to step 5002, via pointer 'C'. Step 5034 is effectively implemented in one embodiment by interrupting power to communication device 100a to terminate operation. Operation of PDE 124 can also occur by a sufficient system interrupt to reset the control and states of the current process in PDE 124. Alternatively step 5034 is effectively implemented by maintaining power on to allow continued operation of preamble detection system.

While the present embodiment applies flowcharts 5000a and 5000b to a digital wireless communication system, the present invention can be applied to any electronic device for any type of application. Within the wireless communication system described in the present embodiment, the present invention is applicable to mobile units, base stations, etc. Furthermore, while flowcharts 5000a and 5000b of the present embodiment show a specific sequence and quantity of steps, the present invention is suitable to alternative embodiments. For example, not all the steps provided in the aforementioned flowcharts are required for the present invention. Similarly, other steps may be omitted depending upon the application. In contrast, the present invention is well suited to incorporating additional steps to those presented, as required by an application, or as desired for permutations in the process. Lastly, the sequence of the steps for flowcharts 5000a and 5000b can be modified depending upon the application. Thus, while the present flowcharts are shown as a single serial process, they can also be implemented as a continuous or parallel process.

Many of the instructions for the steps, as well as the data input and output from the steps of flowcharts 5000a and 5000b are at lest partially implemented utilizing memory and processor hardware components, e.g. system memory 120 and processor 122 in FIG. 1A, or local memory 222 and controller 224 of FIG. 2A. The memory storage used to implement the flowchart steps in the present embodiment can either be permanent, such as read only memory (ROM), or temporary memory such as random access memory (RAM). Similarly, the processor used to implement the flowchart steps can either be a dedicated controller, an existing system processor, or it can be a dedicated digital signal processor (DSP), as appropriate for the type of step. Alternatively, the instructions may be implemented using some from of a state machine.

Some portions of the detailed description, e.g., the processes, are presented in terms of procedures, logic blocks, processing, and other symbolic representations of operations on data bits within a computer or digital system memory or on signals within a communication device. These descriptions and representations are the means used by those skilled in the digital communication arts to most effectively convey the substance of their work to others skilled in the art. A procedure, logic block, process, etc., is herein, and generally, conceived to be a self-consistent sequence of steps or instructions leading to a desired result. The steps are those requiring physical manipulations of physical quantities. Usually, though not necessarily, these physical manipulations take the form of electrical or magnetic signals capable of being stored, transferred, combined, compared, and otherwise manipulated in a communication device or a processor. For reasons of convenience, and with reference to common usage, these signals are referred to as bits, values, elements, symbols, characters, terms, numbers, or the like with reference to the present invention.

It should be borne in mind, however, that all of these terms are to be interpreted as referencing physical manipulations and quantities and are merely convenient labels to be interpreted further in view of terms commonly used in the art. Unless specifically stated otherwise as apparent from the following discussions, it is understood that throughout discussions of the present invention, terms such as "providing," "transmitting," "repeating," "communicating," "synchronizing," "linking," "executing," "reading," "identifying," "jumping," "returning," "generating," or the like, refer to the action and processes of a communication device or a similar electronic computing device, that manipulates and transforms data. The data is represented as physical (electronic) quantities within the communication devices components, or the computer system's registers and memories, and is transformed into other data similarly represented as physical quantities within the communication device components, or computer system memories or registers, or other such information storage, transmission or display devices.

In view of the embodiments described herein, the present invention has been shown to provide a method and apparatus that overcomes the limitations associated with the varied hardware, software, and methodology of transmitting digital signals that are unique and incompatible between each of the various communication protocols. Furthermore, embodiments described for the present invention overcome the lack of forward compatibility associated with incremental improvements in communication protocols. Additionally, the present invention overcomes the potential mismatch between transmitter resources designed for a specific channel format and the changing transmitter resource demand in a given communication device. The limitations of fixed interfaces between transmitter resources and antenna resources and the limitations of a cross bar switch in selectively coupling transmitter resources to antenna resources are also overcome by the method and apparatus of the present invention. The present invention also overcomes the limitations of pushing data through a communications device to the transmitter.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. An engine for detecting a code sequence in input data of a communication signal, the code sequence being a sum of a first code sequence and a second code sequence, the detection engine comprising:

a data input line for receiving input data;

a code input line for selectively receiving the first code sequence or the second code sequence, the first code sequence having a period longer than a period for the second code sequence;

a despreader coupled to the data input line, and the code input line, the despreader producing despread results between the first code sequence and the input data; and a plurality of memory registers coupled to the despreader, wherein each of the plurality of memory registers stores only a portion of the despread results;

wherein each of the plurality of memory registers only stores a despread result for a given periodic offset from the first despread result, the given periodic offset equal to the period of the second code sequence.

2. An engine for detecting a code sequence in input data of a communication signal, the code sequence being a sum of a first code sequence and a second code sequence, the detection engine comprising:

a data input line for receiving input data;

a code input line for selectively receiving the first code sequence or the second code sequence, the first code sequence having a period longer than a period for the second code sequence;

a despreader coupled to the data input line, and the code input line, the despreader producing despread results between the first code sequence and the input data; and a plurality of memory registers coupled to the despreader, wherein each of the plurality of memory registers stores only a portion of the despread results;

wherein the plurality of memory registers is at least equal to the period of the second code sequence.

3. An engine for detecting a code sequence in input data of a communication signal, the code sequence being a sum of a first code sequence and a second code sequence, the detection engine comprising:

a data input line for receiving input data;

a code input line for selectively receiving the first code sequence or the second code sequence, the first code sequence having a period longer than a period for the second code sequence;

a despreader coupled to the data input line, and the code input line, the despreader producing despread results between the first code sequence and the input data; and a plurality of memory registers coupled to the despreader, wherein each of the plurality of memory registers stores only a portion of the despread results;

wherein an nth memory register stores a correlation result between one bit of the input data and one bit of the first code sequence at an nth offset of the second code sequence.

4. An engine for detecting a code sequence in input data of a communication signal, the code sequence being a sum of a first code sequence and a second code sequence, the detection engine comprising:

a data input line for receiving input data;

a code input line for selectively receiving the first code sequence or the second code sequence, the first code sequence having a period longer than a period for the second code sequence;

a despreader coupled to the data input line, and the code input line, the despreader producing despread results between the first code sequence and the input data; and a plurality of memory registers coupled to the despreader, wherein each of the plurality of memory registers stores only a portion of the despread results;

wherein each of the memory registers stores accumulated despread results for over a search window period.

5. An engine for detecting a code sequence in input data of a communication signal, the code sequence being a sum of a first code sequence and a second code sequence, the detection engine comprising:

a data input line for receiving input data;

a code input line for selectively receiving the first code sequence or the second code sequence, the first code sequence having a period longer than a period for the second code sequence;

a despreader coupled to the data input line, and the code input line, the despreader producing despread results between the first code sequence and the input data; and a plurality of memory registers coupled to the despreader, wherein each of the plurality of memory registers stores only a portion of the despread results;

wherein each of the memory registers stores correlation results for a fraction of a search window period.

6. An engine for detecting a code sequence in input data of a communication signal, the code sequence being a sum of a first code sequence and a second code sequence, the detection engine comprising:

a data input line for receiving input data;

a code input line for selectively receiving the first code sequence or the second code sequence, the first code sequence having a period longer than a period for the second code sequence;

a despreader coupled to the data input line, and the code input line, the despreader producing despread results between the first code sequence and the input data; and a plurality of memory registers coupled to the despreader, wherein each of the plurality of memory registers stores only a portion of the despread results;

wherein the plurality of memory registers at least twice the period of the second code sequence for a ping-pong memory operation.

7. An engine for detecting a code sequence in input data of a communication signal, the code sequence being a sum of a first code sequence and a second code sequence, the detection engine comprising:

a data input line for receiving input data;

a code input line for selectively receiving the first code sequence or the second code sequence, the first code sequence having a period longer than a period for the second code sequence;

a despreader coupled to the data input line, and the code input line, the despreader producing despread results between the first code sequence and the input data;

a plurality of memory registers coupled to the despreader, wherein each of the plurality of memory registers stores only a portion of the despread results; and an additional correlator for correlating the second code sequence with the correlation results from the first code sequence and the input data.

8. An engine for detecting a code sequence in input data of a communication signal, the code sequence being a sum of a first code sequence and a second code sequence, the detection engine comprising:

a data input line for receiving input data;

a code input line for selectively receiving the first code sequence or the second code sequence, the first code sequence having a period longer than a period for the second code sequence;

a despreader coupled to the data input line, and the code input line, the despreader producing despread results between the first code sequence and the input data;

a plurality of memory registers coupled to the despreader, wherein each of the plurality of memory registers stores only a portion of the despread results; and a selective interconnect for providing the second code sequence to a secondary descrambling operation between using descrambled results from the first code sequence.

9. A detection system for detecting a composite code sequence in input data of a communication signal, the composite code sequence being a sum of a first code sequence and a second code sequence, the detection engine comprising:
   a memory for storing input data;
   a bus coupled to the memory; and
   a plurality of processing engines coupled to the bus in parallel, the plurality of processing engines for storing despread results between only the first code sequence and the input data;
   wherein each of the plurality of detection engines has a plurality of memory registers, each of the plurality of memory registers storing only a portion of the correlation result between the input data and the second code sequence.

10. A detection system for detecting a composite code sequence in input data of a communication signal, the composite code sequence being a sum of a first code sequence and a second code sequence, the detection engine comprising:
   a memory for storing input data;
   a bus coupled to the memory;
   a plurality of processing engines coupled to the bus in parallel, the plurality of processing engines for storing despread results between only the first code sequence and the input data;
   a code input line coupled to each of the plurality of correlation engines; and
   a plurality of delay operators coupled to the code input line.

11. The detection system recited in claim 10 wherein the delay for each of the plurality of delay operators is a value of one for performing parallel searches with different offsets.

12. The detection system recited in claim 10 wherein the plurality of delay operators is a value equal to the code space divided by the number of processing engines performing a piecewise search of a single offset between the input data and the first code sequence.

13. The detection system recited in claim 10 wherein the memory is partitioned to allow each of the plurality of processing engines access to offset portions of input data.

14. A detection system for detecting a composite code sequence in input data of a communication signal, the composite code sequence being a sum of a first code sequence and a second code sequence, the detection engine comprising:
   a memory for storing input data;
   a bus coupled to the memory; and
   a plurality of processing engines coupled to the bus in parallel, the plurality of processing engines for storing despread results between only the first code sequence and the input data;
   wherein one of the plurality of delay operator is coupled to one of the plurality of processing engines except a first processing engine.

15. A method of detecting a composite code sequence in input data of a communication signal using a processing engine, the method comprising the steps of:
   a) receiving the input data with the composite code sequence, the composite code sequence being a combination of a first code sequence and a second code sequence;
   b) receiving the first code sequence, the first code sequence having a possible offset with respect to the input data;
   c) descrambling the input data with the first code sequence to obtain descrambled results;
   d) storing only a portion of the descrambled results in one of a plurality of memory locations; and
   e) accumulating each of the portions of descrambled results that occurred at a periodic location, the periodic location equal to the length of the second code sequence.

16. A method of detecting a composite code sequence in input data of a communication signal using a processing engine, the method comprising the steps of:
   a) receiving the input data with the composite code sequence, the composite code sequence being a combination of a first code sequence and a second code sequence;
   b) receiving the first code sequence, the first code sequence having a possible offset with respect to the input data;
   c) descrambling the input data with the first code sequence to obtain descrambled results;
   d) storing only a portion of the descrambled results in one of a plurality of memory locations;
   e) descrambling a sample of the first code sequence with the sample of the input data to obtain a descrambled result; and
   f) storing the descrambled result in a portion of memory.

17. A method of detecting a composite code sequence in input data of a communication signal using a processing engine, the method comprising the steps of:
   a) receiving the input data with the composite code sequence, the composite code sequence being a combination of a first code sequence and a second code sequence;
   b) receiving the first code sequence, the first code sequence having a possible offset with respect to the input data;
   c) descrambling the input data with the first code sequence to obtain descrambled results; and
   d) storing only a portion of the descrambled results in one of a plurality of memory locations;
   e) repeating receiving step a) through storing step d) for a subsequent sample of the first code sequence, a subsequent sample of the input data, and a subsequent portion of memory, for a period equal to the length of the second code sequence;
   f) adding the results from memory for descrambling steps performed at the same periodic position to obtain a partial sum of correlation results, the period equal to the length of second code sequence; and
   g) overwriting the partial sum of correlation results in the memory.

18. A method of detecting a composite code sequence in input data of a communication signal using a processing engine, the method comprising the steps of:
   a) receiving the input data with the composite code sequence, the composite code sequence being a combination of a first code sequence and a second code sequence;
   b) receiving the first code sequence, the first code sequence having a possible offset with respect to the input data;

c) descrambling the input data with the first code sequence to obtain descrambled results;

d) storing only a portion of the descrambled results in one of a plurality of memory locations;

e) repeating receiving step a) through storing step d) for a subsequent sample of the first code sequence, a subsequent sample of the input data, and a subsequent portion of memory, for a period equal to the length of the second code sequence;

f) adding the results from memory for descrambling steps performed at the same periodic position in the descrambling process to obtain a partial sum of correlation results;

g) overwriting the partial sum of descrambled results in the memory;

h) repeating steps e) through f) until the length of a desired search window is attained;

i) reading the partial sum of descrambled results from the memory;

j) receiving a sample of the second code sequence; and k) descrambling the sample of the second code sequence with the partial sum of descrambled results from the memory.

* * * * *

UNITED STATES PATENT AND TRADEMARK OFFICE
CERTIFICATE OF CORRECTION

PATENT NO. : 6,694,496 B2
DATED : February 17, 2004
INVENTOR(S) : Gregory R. Goslin et al.

It is certified that error appears in the above-identified patent and that said Letters Patent is hereby corrected as shown below:

Title page,
Item [73], Assignee, delete "Morphics Technology, Inc., Cambell. CA" and substitute -- Infineon Technologies AG --.

Signed and Sealed this

Fifth Day of October, 2004

JON W. DUDAS
*Director of the United States Patent and Trademark Office*